United States Patent [19]

Elson

[11] 4,215,384

[45] Jul. 29, 1980

[54] HOSE CONSTRUCTION WITH ELECTRICAL CONDUCTOR FOR DISSIPATING STATIC ELECTRICITY AND METHOD OF MAKING SAME

[75] Inventor: Arthur M. Elson, Budd Lake, N.J.

[73] Assignee: Dayco Corporation, Dayton, Ohio

[21] Appl. No.: 884,793

[22] Filed: Mar. 9, 1978

[51] Int. Cl.² ......................... F16L 11/12; H05F 3/02
[52] U.S. Cl. ..................................... 361/215; 174/47; 174/78
[58] Field of Search .......................... 174/47, 74 R, 78; 361/215; 156/92, 143, 149, 281; 339/15, 16 R, 16 RC, 16 C

[56] References Cited

U.S. PATENT DOCUMENTS

| | | | |
|---|---|---|---|
| 2,153,199 | 4/1939 | Miller | 361/215 |
| 3,457,359 | 7/1969 | Soucy | 174/78 X |
| 3,500,867 | 3/1970 | Elson | 138/125 |
| 3,555,170 | 1/1971 | Petzetakis | 174/47 |
| 3,886,980 | 6/1975 | Elson | 138/127 |
| 3,963,856 | 6/1976 | Carlson et al. | 361/215 X |

FOREIGN PATENT DOCUMENTS

| | | | |
|---|---|---|---|
| 1140034 | 11/1962 | Fed. Rep. of Germany | 174/47 |
| 813151 | 5/1959 | United Kingdom | 174/47 |
| 973750 | 10/1964 | United Kingdom | 174/47 |

Primary Examiner—Laramie E. Askin
Attorney, Agent, or Firm—Reuben Wolk

[57] ABSTRACT

A hose construction and method of making same are provided wherein such hose construction has an inside surface defining a passage for conveying fluid under pressure and an electrical conductor disposed along the hose construction and having a pair of opposed terminal ends adapted to be placed in communication with the inside passage for dissipating static electricity caused by fluid flow through the passage and wherein such hose construction has an electrically conductive metal clip connected to one of the terminal ends of the electrical conductor and has a portion thereof disposed substantially flush with the inside surface adjacent an associated end portion of the hose construction to facilitate engagement thereof by a hose connector.

3 Claims, 7 Drawing Figures

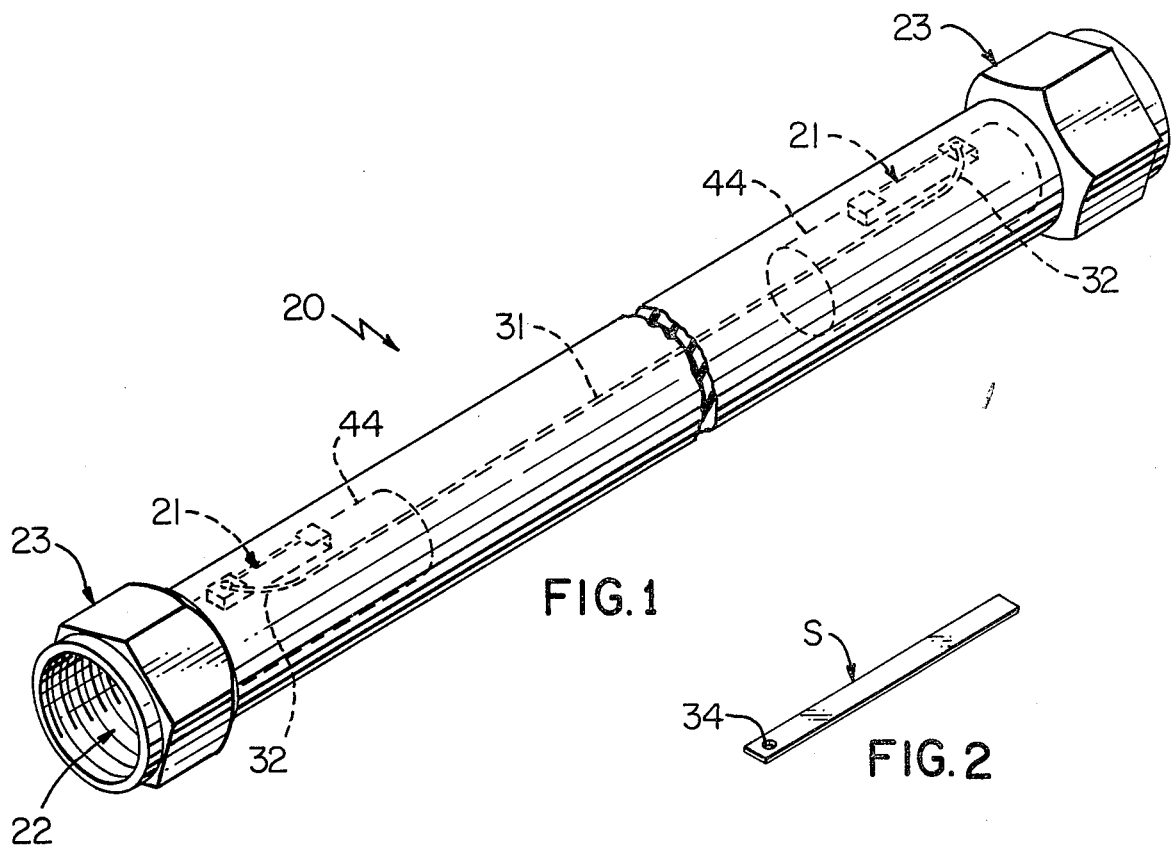
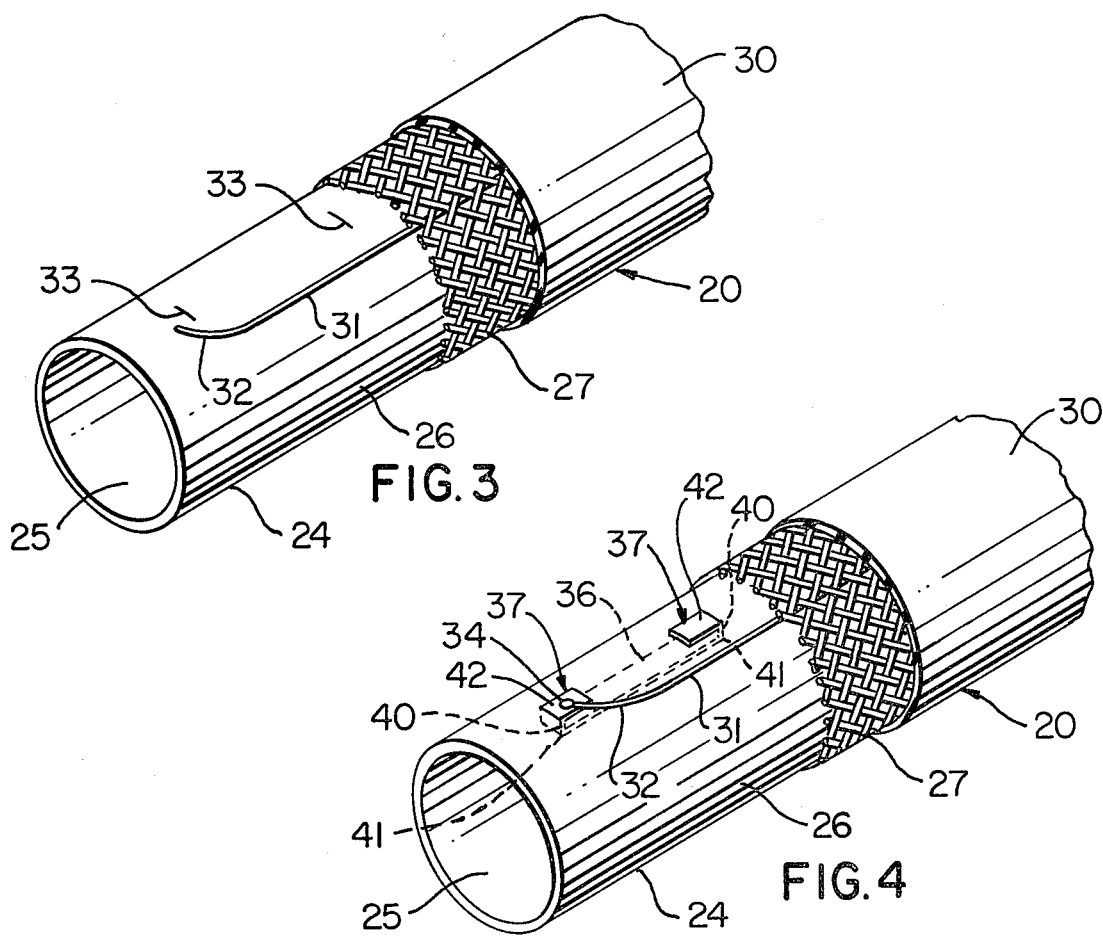

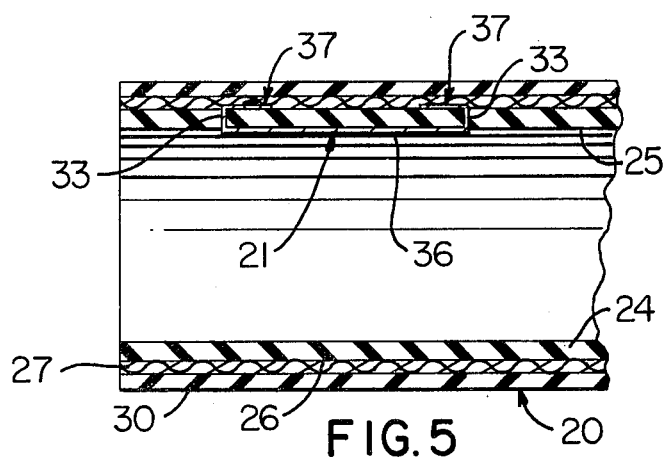
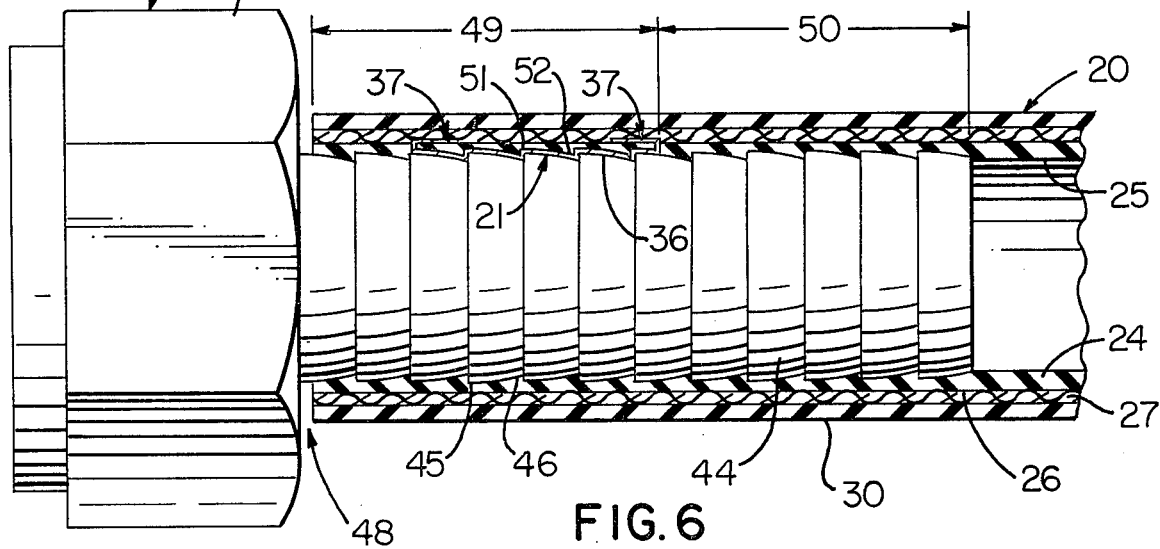
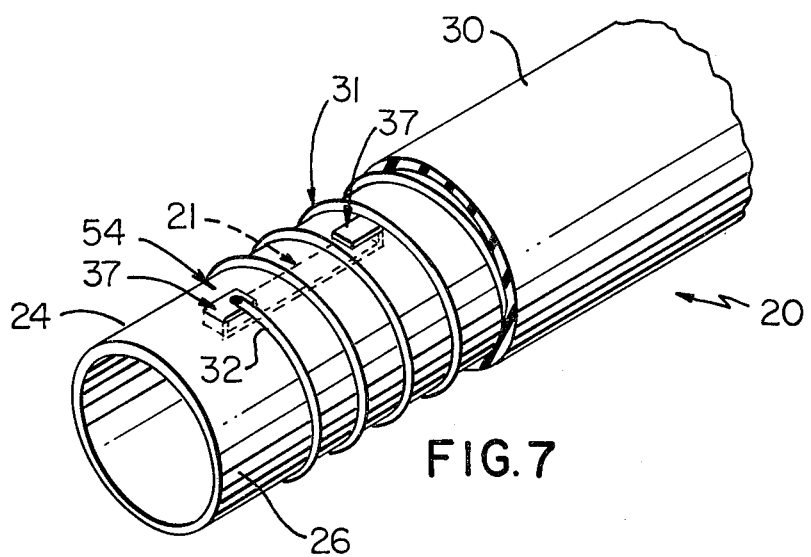

HOSE CONSTRUCTION WITH ELECTRICAL CONDUCTOR FOR DISSIPATING STATIC ELECTRICITY AND METHOD OF MAKING SAME

BACKGROUND OF THE INVENTION

Hose constructions or hoses made primarily of electrically insulating polymeric materials are used in many applications to convey volatile fluids therethrough; and, the danger exists that static electricity caused by fluid flow through such hose constructions may cause an explosion. Accordingly, it is common practice to provide each of such hose constructions with anti-static means usually comprising an electrical conductor extending along the length of the hose construction with the electrical conductor having opposed end portions which protrude into the fluid passage of such hose construction for engagement by hose connectors which are electrically grounded to prevent build-up of a charge of static electricity.

A common problem with each of such hose constructions having an electrical conductor with such protruding end portions is that the hose connectors coming into contact therewith often break such end portions making the hose construction useless for the purpose of dissipating static electricity whereby it is necessary to scrap the entire hose construction.

SUMMARY

It is a feature of this invention to provide in a hose construction having an electrical conductor used for dissipating static electricity improved means for placing opposed terminal ends of the electrical conductor in communication with a passage through such hose construction.

Another feature of this invention is to provide in a hose construction having an inside surface defining a passage for conveying fluid under pressure and an electrical conductor disposed along the hose construction and having a pair of opposed terminal ends adapted to be placed in communication with the inside passage for dissipating static electricity caused by fluid flow through the passage, the improvement comprising, an electrically conductive metal clip connected to one of the terminal ends of the electrical conductor and having a portion thereof disposed substantially flush with the inside surface adjacent an associated end portion of the hose construction to facilitate engagement thereof by a hose connector.

Another feature of this invention is to provide an improved method of making an anti-static hose construction of the character mentioned.

Accordingly, it is an object of this invention to provide an improved hose construction and method of making same having one or more of the novel features set forth above or hereinafter shown or described.

Other features, objects, details, uses, and advantages of this invention will be readily apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in elevation, parts in cross-section, parts broken away, and parts shown by dotted lines particularly illustrating one exemplary embodiment of the hose construction of this invention and method of making same;

FIG. 2 is a perspective view illustrating a metal strip particularly adapted to be bent to define an electrically conductive metal clip comprising the hose construction of this invention;

FIG. 3 is a fragmentary perspective view particularly illustrating the detailed construction of three layers comprising the hose construction of FIG. 1 and showing the manner in which slits are formed in an inner tubular layer thereof to facilitate installing the strip of FIG. 2 in position and forming the clip of this invention;

FIG. 4 is a view similar to FIG. 3 illustrating the metal strip of FIG. 2 as formed to define a completed clip and showing a terminal end of an electrical conductor fastened to such clip;

FIG. 5 is a fragmentary cross-sectional view taken longitudinally through an end portion of the hose construction of FIG. 1 with its clip installed in position and prior to installation of a hose connector into the end portion of the hose construction;

FIG. 6 is a view with parts in elevation, parts in cross-section, and parts broken away illustrating a typical female hose connector installed in position in the hose connector highlighting the manner in which the hose connector engages a main portion of the clip; and FIG. 7 is a view similar to FIG. 4 illustrating another exemplary embodiment of this invention comprising a hose construction which employs reinforcing means which serves the dual purpose of reinforcing the hose construction and serving as an electrical anti-static wire.

DESCRIPTION OF ILLUSTRATED EMBODIMENTS

Reference is now made to FIG. 1 of the drawings which illustrates an exemplary hose construction or hose 20 which has improved means in the form of a pair of clips 21 each communicating with the internal passage 22 of the hose construction and each engaging an associated hose connector 23 for the purpose of dissipating static electricity produced by fluid flow through the passage 22. Each hose connector 23 may be suitably electrically grounded using techniques (not shown) which are known in the art whereby there is a continual discharge of any static electricity tending to build up in the hose construction 20 through its clips 21 and hose connectors 23.

As will be readily apparent from FIG. 3 of the drawings, the hose construction 20 comprises an inner tubular layer 24 which may be made of any suitable polymeric material such as a rubber compound, for example, and the layer 24 has an inside surface 25 defining the passage 22 of the hose construction 20 and an outside surface 26. The hose construction 20 also has reinforcing means in the form of a braided layer 27 which is disposed concentrically around the inner layer 24 and in particular against the outside surface 26 of such inner layer 24. The hose construction 20 also has an outer tubular layer 30 which serves as a cover for the hose construction and the cover layer 30 is also made of a suitable polymeric material and is disposed concentrically around and against the outer surface portions of the braided layer 27.

The hose construction 20 has an electrical conductor 31 disposed therealong and such conductor is preferably provided in sandwiched relation between the outside surface 26 of the inner layer 24 and the braided layer 27 while extending substantially along the entire length of the hose construction 20. The electrical conductor 31 has a pair of opposed terminal ends 32 and each end is mechanically and electrically connected to an associated metal clip 21 of this invention and such clip will now be described in detail.

The clip 21 is preferably made of a flat strip S (FIG. 2) of comparatively soft and bendable electrically conductive material and may be made primarily of copper, aluminum, or a suitable ferrous metal. The strip S is preferably installed in position adjacent an associated end portion of the hose construction 20 by cutting a pair of (FIG. 3) parallel slits 33 in the inner tubular layer 24 whereupon the straight elongated strip 21 is then inserted through the slits 33 and the end portions thereof bent as will be described subsequently to define the clip 21 as illustrated in FIGS. 1 and 4 of the drawings, for example.

The strip S and formed clip 21 has a hole or opening 34 therein and such opening 34 is particularly adapted to be used in extending a terminal end or end portion 32 of the electrical conductor 31 therethrough whereupon such end is suitably mechanically and electrically fixed in position using any technique known in the art. For example, end portion 32 may be extended through opening 34, upon itself, and then soldered or brazed to provide a firm connection.

Once a clip 21 is attached or self-fastened in position at one end of the hose construction 20, the braided layer 27 is suitably formed in position by braiding over the clip 21 and over the electrical conductor 31 sandwiching such clip and conductor against the inner tubular layer 24. Once the desired length of hose construction 20 has been defined, suitable slits 33 are formed or cut in opposite end portions of the hose construction and another clip 21 installed or self-fastened in position. The opposed terminal end portion or end 32 of the electrical conductor 31 is then suitably fixed in position whereupon the braiding is continued over the clip to the end of the hose construction.

The hose construction consisting of inner tubular layer 24, braided layer 27, and installed clips 21 with conductor 31 extending therebetween may then have the outer tubular cover layer 30 suitably formed therearound by any technique known in the art. For example, such two layer hose construction with its conductor 31 and clips 21 may be passed through a cross-head extruder to define the cover layer 30 in position. The hose construction is now basically complete except for installation of the hose connectors 23 in the opposite ends thereof.

Each clip 21 is made by forming or bending strip S and once bent each strip has a main elongate central portion 36 (FIG. 4) which in this example has a pair of extensions extending from its opposite ends and each extension is designated generally by the reference numeral 37. Each extension 37 is in the form of an L-shaped extension defined by a pair of legs including a first leg 40 extending from an associated terminal end 41 of the main portion 36 and perpendicular thereto and a second leg 42 adjoining the first leg 40 and extending perpendicularly therefrom while overlying the main central portion 36 in parallel relation therewith and against the outside surface 26 of the inner tubular layer 24. With this construction and arrangement and with the clip 21 defined by extending the strip S through its slits 33, as previously mentioned, it will be seen that each leg 40 is, in essence, surrounded by adjoining polymeric material of the inner tubular layer 24. Each second leg 42 upon being bent in position overlies and is disposed against the outside surface 26 of the inner tubular layer whereby, in essence, the clip 21 is self held in position. It will be noted that one of the L-shaped portions 37, shown as the L-shaped portion more closely adjacent an associated terminal end of the hose construction, has the opening 34 provided therein for attachment of an associated end 32 of the electrical conductor 31.

As previously mentioned, the hose construction 20 of this example is shown as having a pair of connectors 23 installed in position at opposite ends thereof; and, the connectors 23 of this example are both shown as female connectors. However, the hose connectors need not necessarily be female connectors but may both be male connectors or may consist of a male connector at one end and a female connector at the other end. In addition, each of such connectors may be any suitable type of connector known in the art.

Regardless of the type of connector employed, each connector, such as connector 23, has a shank portion (FIG. 6) which is designated generally by the reference numeral 44 and such shank portion or shank 44 has an undulating sawtoothed outside surface which is known in the art and defined by alternating projections 45 and recesses 46. Each connector 23 is installed in its associated end portion of the hose construction 20 and the installation may be achieved utilizing any suitable technique known in the art and usually by physically forcing the shank 44 within the tubular layers of the hose construction until the connector portion 47 thereof is closely adjacent the terminal ends of the tubular layers of such hose construction as shown at 48. The shank 44 is forced in position such that a portion of the shank 44 closely adjacent its connector portion 47 has a length 49 which overlies its clip 21 and a length 50 which extends inwardly thereof and assures the provision of a fluid-tight seal between the hose construction and the connector 23.

It will be appreciated that a hose clamp, or the like, (not shown) may be provided concentrically around each terminal outer end of the tubular layers of the hose construction 20 clamping such end against its shank portion 44 and as is known in the art. Further, a plurality of hose clamps may be provided concentrically around each terminal outer end for the same purpose.

As indicated previously, each clip 21 is made of a comparatively soft bendable material and with the shank portion 44 installed in position the material is such that with the connector installed as shown in FIG. 6 the main elongate central portion 36 of the clip 21 assumes the configuration of the shank portion and, in essence, assumes a saw-toothed configuration defined by alternating projections 51 and recesses 52 which correspond respectively to the projections 45 and recesses 46 of the shank portion 44. This saw-toothed or undulating configuration of the main elongate portion 36 has a central longitudinal axis disposed parallel to the longitudinal axis of the hose construction 20. The saw-toothed configuration is defined by the constant urging produced by the polymeric material comprising the inner tubular layer 24 and with such layer 24 being held against radial movement by reinforcing layer 27 and outer layer 30 whereby polymeric layer 24, in essence, forms the main part 36 of clip 21 to define the saw-toothed configuration therein defined by projections 51 and recesses 52.

The strip S and hence clip 21 may be made of a material containing aluminum, copper, or a ferrous metal which is easily bendable and as previously mentioned. In one example of this invention a copper strip S was employed having a length of roughly six inches, a width of one-fourth inch, and a thickness of 0.020 inch.

It will also be appreciated that the inner tubular layer 24 may be made of any suitable synthetic plastic or rubber known in the art. In this example such material is shown by cross hatching in the drawings as being made of rubber. For example, such inner tubular layer or tube 24 may be made of a rubber material such as chloroprene or a nitrile-butadiene synthetic rubber of substantially uniform thickness and in one application of this invention the tube 24 had a thickness generally of the order of 0.105 inch.

The reinforcing layer 27 may be in the form of a braided layer as previously mentioned and although any suitable material may be employed for this purpose, in this example of the invention a fabric yarn is preferably employed which may be made of a synthetic material such as polyester or nylon. The layer 27 may be impregnated with a suitable friction compound to assure a tenacious bond between the outside surface 26 of the inner tubular layer 24 and the inside surface of the outer cover layer 30. In lieu of a braided layer 27 a woven layer of a suitable material may be provided.

The outer cover layer 30 also may be made of any suitable polymeric material and in one example of the invention such layer was made of chloroprene rubber suitably compounded for maximum resistance to abrasion, weathering, light ageing, and oxidation, for example. The cover layer is preferably made of a uniform thickness and may be 0.060 inch thick. It will also be appreciated that any suitable means may be provided at the terminal ends of the tubular layers of the hose construction 20 to prevent wicking of the reinforcing braided layer 27.

The electrical conductor 31 may be any suitable electrically conductive wire. Accordingly, such wire may be a single strand wire or a wire 31 comprised of a plurality of suitably twisted strands.

The improved clip 21 of this invention need not necessarily be used with a separate electrical conductor 31 which is held in position by a reinforcing means in the form of a braided layer 27. For example, and as seen in FIG. 7 of the drawings, the electrical conductor 31 may be in the form of a dual purpose electrical conductor-and reinforcing means or reinforcing wire which is also designated by the reference numeral 31 in FIG. 7 of the drawings. The dual purpose electrical conductor-reinforcing wire 31 may be helically wound around the inner tubular layer 24 against the outside surface 26 thereof while having a terminal end 32 connected to one of the L-shaped portions 37 of an associated clip 21 as shown at 54.

Each clip 21 may be suitably fastened in position in a similar manner as described previously in connection with FIGS. 3 and 4. Further, the dual purpose electrical conductor-reinforcing wire 31 may be wound in position before or after each clip 21 is fastened in position. Likewise, the outer cover layer 30 may be suitably formed in position using any technique known in the art to complete the hose construction 20 of FIG. 7.

The inner tubular layer 24 comprising the hose construction 20 of FIGS. 1-6 may be made by providing an uncured inner layer or tube 24 and forming or cutting a pair of slits 33 therein at its leading end. A clip 21 is then installed in position as previously described whereupon a terminal end portion 32 of the electrical conductor 31 may be fastened in position. The conductor 31 is then extended along the length of the tube 24 whereupon the braided layer 27 may be suitably braided in position sandwiching the wire against inner tubular layer 24. Once the desired length of hose construction is obtained, slits 33 are cut in the trailing end of the uncured tube 24 and a clip 21 installed in position in a similar manner as described earlier. A suitable uncured frictioning compound or material is then suitably applied so that it flows in the open spaces of the braided layer 27 and coats part of the braided layer. The opposite terminal end portion of the electrical conductor 31 is then fastened in position whereupon the braiding is completed thereover. During the braiding of the layer 27 in position it will be appreciated that the leg portions 42 are urged firmly against the outside surface 26 of the inner tubular layer 24. Once the braided layer 27 has been braided in position, the outer tubular layer may be applied using any suitable technique known in the art as by passing the two layer hose construction through a cross-head extruder (not shown), or the like, and the outer layer defined thereover. The entire assembly may then be suitably cured in accordance with the techniques known in the art.

The hose construction in FIG. 7 may be similarly defined with the step of braiding layer 27 in position being replaced by the step of helically winding the dual purpose wire 31 in position to define the reinforcing layer and complete the hose construction.

The electrical conductor 31 utilized in the hose construction 20 need not necessarily be disposed substantially parallel to the longitudinal axis of such hose construction but may be helically wound against the outside surface of the inner tubular layer 24, if desired.

The hose construction 20 employing the improved electrical clips 21 may be used to convey fluids of all types including liquids, gases, or fluids comprised of both liquids and gases. Further, it has been found that by employing the clip 21 of this invention it is possible to install hose connectors such as hose connectors 23 at the opposed ends of the hose construction with minimum scrappage of hoses while still providing a hose construction having optimum electrical anti-static properties.

While present exemplary embodiments of this invention, and methods of practicing the same, have been illustrated and described, it will be recognized that this invention may be otherwise variously embodied and practiced within the scope of the following claims.

What is claimed is:

1. In a hose construction having an inside surface defining a passage for conveying a fluid under pressure and an electrical conductor disposed along the hose construction and having a pair of spaced terminal ends adapted to be placed in electrical communication with said passage for dissipating static electricity caused by fluid flow through said passage, a pair of hose connectors connected to opposed end portions of said hose construction with each hose connector having an undulating outside surface engaging said inside surface at an associated end portion of said hose construction, the improvement comprising a pair of electrically conductive metal clips with each clip being connected to an associated terminal end of said electrical conductor and having a portion thereof sandwiched between said inside surface and the outside surface of an associated hose connector to provide an electrical connection therebetween, each clip being made of a flat strip of an easily bendable metal with said portion thereof having an undulating configuration conforming to the outside surface of its associated hose connector, said portion of each clip being a main elongate portion having a central longitudinal axis disposed parallel to the longitudinal axis of said hose construction and each clip further comprising a pair of L-shaped end portions extending from opposite ends of said main portion, said main and L-shaped portions defining each clip as a single-piece structure, said L-shaped portions engaging and self holding each clip on said hose construction, one of said L-shaped portions of each clip having said electrical conductor connected thereto, and said easily bendable metal defining each clip assuring that each main portion thereof conforms to the undulating outside surface of its associated hose connector.

2. In a hose construction as set forth in claim 1 the further improvement in which each L-shaped portion of each clip has a first leg disposed substantially perpendicular to said main portion and a second leg disposed substantially parallel thereto, each parallel leg overlying its main portion and one of said parallel legs of each clip having an associated terminal end of said electrical conductor connected thereto.

3. In a hose construction as set forth in claim 2 the further improvement in which said hose construction is defined by an inner tubular layer made of a polymeric material and having said inside surface, reinforcing means disposed concentrically around said inner layer, and an outer layer disposed around said reinforcing means, said first leg of each L-shaped portion extending through said inner layer with said second leg of each L-shaped portion overlying and being disposed against said inner layer, said reinforcing means sandwiching said second legs against said inner layer.

* * * * *